United States Patent [19]

Monma et al.

[11] Patent Number: 4,529,539

[45] Date of Patent: Jul. 16, 1985

[54] ELECTRICALLY CONDUCTIVE POLYMERIC COMPOSITION

[75] Inventors: Masayuki Monma; Hiroshi Kuramochi, both of Kormuro Ina, Japan

[73] Assignee: Kokoku Rubber Industrial Company Limited, Tokyo, Japan

[21] Appl. No.: 493,052

[22] Filed: May 9, 1983

[51] Int. Cl.$^3$ ............................................... H01B 1/06
[52] U.S. Cl. .................................... 252/518; 252/500; 524/401; 524/414; 524/419; 524/420; 524/436; 524/502; 524/503
[58] Field of Search ....................... 252/518, 511, 500; 524/419, 401, 436, 420, 502, 503, 414, 415; 525/340, 343, 354, 366, 367

[56] References Cited

U.S. PATENT DOCUMENTS 4,200,701 4/1980 Wetton et al. .................... 252/518
4,230,604 10/1980 Wingrave .......................... 252/518

*Primary Examiner*—Josephine L. Barr
*Attorney, Agent, or Firm*—Louis E. Marn

[57] ABSTRACT

This invention relates to an electrically conductive high-molecular composition which is obtained by mixing a preferred base high-molecular compound such as a thermoplastic resin, a synthetic resin, a rubber or the like with a water-soluble electrolyte and a water-soluble high-molecular compound at a certain desired compounding ratio. More particularly, the water-soluble electrolyte is ionized within an article molded by the base high-molecular compound due to a water content in atmosphere, thereby the water-soluble high molecular compound phase is transferred and the antistatic action is obtained accordingly. The conductive high-molecular composition can be transparent and colored to any desirable color. The compounding ratio of the water-soluble electrolyte and the water-soluble high-molecular compound respectively per 100 weight parts of the base high-molecular compound is from 1 to 10 weight parts.

10 Claims, 3 Drawing Figures

Relative humidity-surface resistance curve

Amount of additives vs. surface resistance curve according to Example I

Relative humidity = 50%

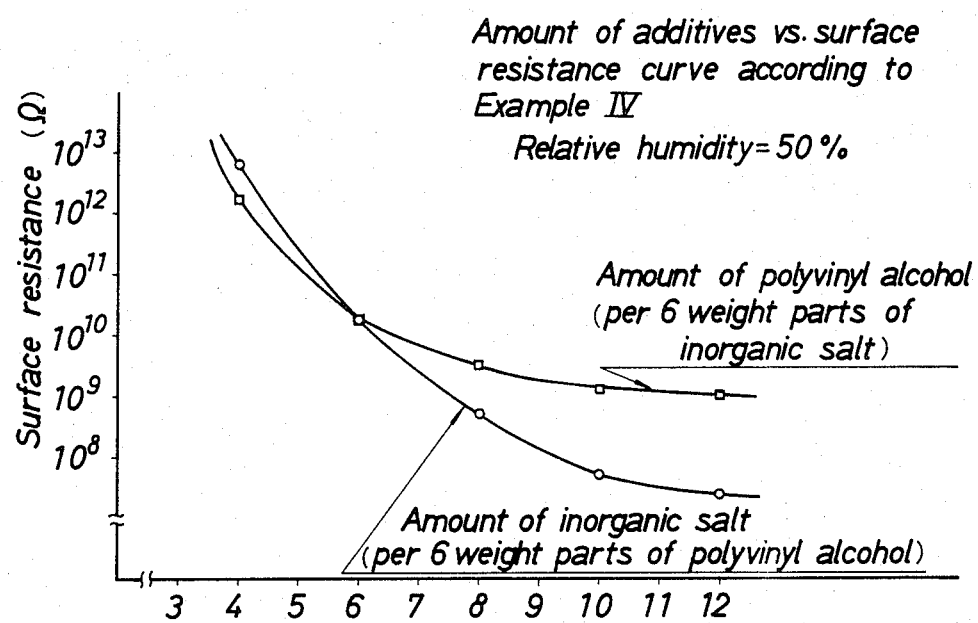

ELECTRICALLY CONDUCTIVE POLYMERIC COMPOSITION

BACKGROUND OF THE INVENTION

This invention relates to an electrically conductive high-molecular composition which can be transparent or colored to any desirable color and has a suitable antistatic performance.

Generally, various attempts have been conducted so far in order to make electrically conductive the high-molecular compounds such as thermoplastic resin or rubber for preventing from being charged with static electricity, e.g. to remove effectively static electricity which may occur easily in electronic equipment such as integrated circuits in particular.

As means for antistatic action there is known a method for mixing high-molecular compound (hereinafter called "base high-molecular compound") constituting mainly a base with carbon black, metallic powder, metallic fiber and the like or a method for mixing same with a surfactant as an antistatic agent.

In the former case that the carbon black, the metallic powder, the metallic fiber and the like are mixed with the base high-molecular compound, the inconvenience is that the color of the molded articles is limited only to a black or brown color. Particularly, when making electrically conductive a thermoplastic resin, the defect is that the strength of the base high-molecular compound is reduced greatly due to a mixture ratio of an electrically conductive agent, thereby its moldability is worsened. On the other hand, in the latter case that only the surfactant is added to the base high-molecular compound, the defect is that the surface resistance drops to only $10^{11}\Omega$ and the maintaining period of the antistatic action is short.

BRIEF SUMMARY OF THE INVENTION

Accordingly, it is a general object of this invention to provide a novel electrically conductive high-molecular composition which can be transparent or colored to any desired color by changing the conventional black or brown color image, and has a suitable antistatic performance. More particulary, a water-soluble electrolyte and a water-soluble high-molecular compound are dispersed uniformly in the base high-molecular compound, e.g. a thermoplastic resin or a rubber. According to the electrically conductive high-molecular compound of this invention, it is possible to obtain the surface resistance value of no more than $10^{10}\Omega$ in the atmosphere of the relative humidity 50%. In addition, the surface resistance value can be maintained semipermanently. The theoretical foundation that such a low surface resistance value of no more than $10^{10}\Omega$ is obtained, is that the water-soluble electrolyte, more particularly a water-soluble and hygroscopic inorganic salt is ionized by humidity in the atmosphere, and a water-soluble high-molecular phase is transferred by the ion thus obtained. The compounding amount of the watersoluble electrolyte and the water-soluble high-molecular compound necessary for providing electrical conductivity is variable by kind and use of the base high-molecular compound or by size or shape of respective molded articles. However, its desirable ratio is from 1 to 10 weight parts per 100 weight parts of the base high-molecular compound. That is, when each of the water-soluble electrolyte and the water-soluble high-molecular compound become less than 1 weight part per 100 weight parts of the base high-molecular compound, it is not possible to obtain the surface resistance of no more than $10^{11}\Omega$ in the atmosphere of the relative humidity 50%. On the other hand, when it is over 10 weight parts, the humidity resistance and mechanical strength may be deteriorated.

Further, the surface resistance of the conductive high-molecular composition is also variable by type of molding means. Under the same conditions the surface resistance by a compression molding indicates a little higher value than that by an injection molding.

When making use of the injection molding, it is preferable to compound from 1 to 5 weight parts of the water-soluble electrolyte and the water-soluble high-molecular compound respectively. On the other hand, when making use of the compression molding, it is preferable to compound from 5 to 10 weight parts of the water-soluble electrolyte and the water-soluble high-molecular compound respectively.

The reason why the surface resistance of the conductive high-molecular composition is variable by the type of molding means is not clarified in detail from the theoretical point of view. However, it is supposed that in case of the injection molding the surface resistance is inclined to become less since the water-soluble high-molecular phase is formed as the high-molecular composition is flowing, while in case of the compression molding the surface resistance is inclined to become a little higher since the flow phenomenon of the water-soluble high-molecular phase does not occur.

Further, since the conductive high-molecular composition according to this invention does not contain either the carbon black or the metallic powder, it can be colored to any desired color by adding a colorant for ordinary thermoplastic resins or rubbers, and it can also be a transparent product.

Still further, when comparing the present invention using a thermoplastic resin as the base high-molecular compound with the article molded by a normal way with a thermoplastic resin without using the water-soluble electrolyte and the water-soluble compound, very little is a difference therebetween in view of physical properties.

Accordingly, the conductive high-molecular compound of this invention is, for example, applied for preventing static electricity of semiconductor, magnetic tape, magnetic disc case, digital appliance, copying machine, switch parts or the like.

Other and further objects, features and advantages of this invention will become apparent from the following description.

BRIEF DESCRIPTION OF THE ACCOMPANYING DRAWINGS

FIG. 3 is a graph showing a relationship of the amount of additives with the surface resistance according to Example IV, in which the amount of an inorganic salt (potassium chloride) and a polyvinyl alcohol respectively is different.

DETAILED DESCRIPTION OF THE INVENTION

The base high-molecular compound which is used in this invention is not limited to a specified material, but may be, as thermoplastic resin, e.g. polyethylene, polypropylene, polystyrene, polybutadiene, polyvinyl chloride, polyvinyl acetate, methacrylate resin, AS resin, ABS resin, AAS resin, ACS resin, AES resin, polyacetal, polyamide, polyphenylene oxide, polycarbonate, polyester, polyurethane or the like. Any one of the aforsaid thermoplastic resins may be provided with conductivity. Particularly, the ABS resin which is applicable for general purposes is suitable.

Further, according to this invention, in order to prevent static electricity and obtain suitable resilience, the material of the base high-molecular compound may be natural rubber, styrene-butadiene rubber, acrylonitrilebutadiene rubber, isoprene rubber, isopreneisobutylene rubber, butadiene rubber, chloroprene rubber, ethylene propylene rubber or the like. It is also available to use a thermoplastic rubber such as styrene-butadiene-styrene-copolymer or the like.

The material of the water-soluble electrolyte according to this invention is preferably salts soluble with water, e.g. chlorides such as potassium chloride and sodium chloride, or sulfate, carbonate, phosphate, thiocyanate, etc. More preferably, it is metallic salt of thiocyanic acid.

Further, the material of the water-soluble high-molecular compound according to this invention is preferably starch, carboxymethylcellulose polyvinyl alcohol, polyethylene glycol, partially saponified substance of polymethacrylate or the like. More particularly, the polyethylene glycol, the polyvinyl alcohol and the partially saponified substance of polymethacrylate are suitable.

We have so far described the base high-molecular compound, water-soluble electrolyte and water-soluble high-molecular compound according to this invention. However, it is of course necessary to add known additives such as titanium oxide, clay, process oil, colorant, stabilizer, age resistor or the like that are necessary for the injection molding, compression molding or the like.

Preferred examples of this invention will be described by a comparative manner.

| Example I | |
| --- | --- |
| ABS resin (Base high-molecular compound JSR-35 made by Nippon Synthetic Rubber Co.) | 100 parts by weight |
| Magnesium chloride (Water-soluble electrolyte) | 2 part by weight |
| Polyvinyl alcohol (Water-soluble high-molecular compound) | 1 part by weight |
| Titanium oxide | 2 part by weight |
| Phthalocyanic blue | 0.2 part by weight |

The above materials were supplied, by using a metering feeder so as to uniformly mix them, into a high-speed kneading twin-screw extruder, subsequently kneaded therein and extruded therefrom, thereby clear blue pellets were obtained by strand cutting.

Figure 1:
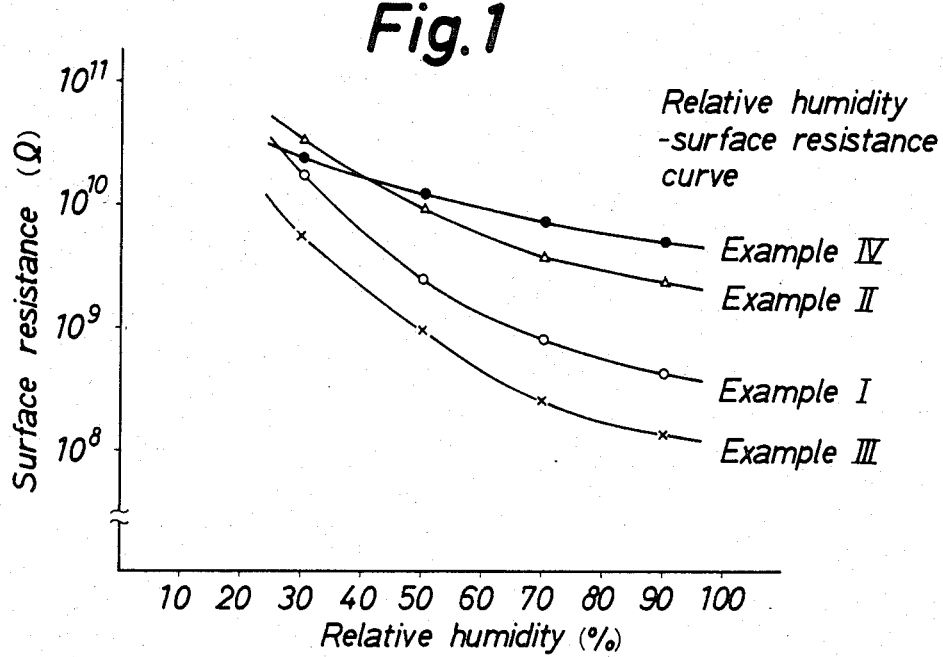
FIG. 1 is a graph of relative humidity - surface resistance curves of the electrically conductive high-molecular compositions according to Examples I, II, III and IV.

The surface resistance-relative temperature graph of the molded article which was injection-molded in a box-like form by using those pellets is shown in FIG. 1.

Namely, the surface resistance was below $10^{10}\Omega$ at the relative humidity 50%.

When having compared the molded article obtained by Example I with a test piece injection-molded by ABS resin as the base high-molecular compound, a difference between the former and the latter was very little in view of the physical properties except for Izod impact value as shown below. The above test piece was prepared in accordance with the dimensions defined by JIS.

| | Test piece molded by ABS resin as base high-molecular compound | Molded article based on Example I |
| --- | --- | --- |
| Tensile strength | 390 kgf/cm$^2$ | 370 kgf/cm$^2$ |
| Bending strength | 640 kgf/cm$^2$ | 630 kgh/cm$^2$ |
| Bending modules of elasticity | 24,000 kgf/cm$^2$ | 22,000 kgf/cm$^2$ |
| Izod impact value (with notch) | 23 kg cm/cm | 14 kg cm/cm |
| Rockwell hardness (R scale) | 102 | 96 |
| Elongation | 10% | 10% |

The aforesaid test result based on JIS was obtained under the following conditions.

| | Size of Test Piece | Test Conditions |
| --- | --- | --- |
| Test strength | 3.2 mm at thickness | Obtained by tensile speed 5 mm/min. |
| Bending strength | 4 mm × 10 mm × 80 mm | Obtained by bending speed 15 mm/min. |
| Bending modules of elasticity | 4 mm × 10 mm × 80 mm | Obtained by bending speed 15 mm/min. |
| Izod impact value | 12.7 mm × 12.7 mm × 63 mm | Obtained at a temperature of 20° C. |
| Elongation | 3.2 mm at thickness | Obtained by tensile speed 1 mm/min. |

Further, a transparent ABS resin (JSR-55 type made by Nippon Synthetic Rubber Co., Ltd.) as the base high-molecular compound was used. In case a titanium or a phthalocyanine blue was not added as a colorant, colorless and transparent molded articles were obtained.

| Example II | |
| --- | --- |
| Polyethylene (Base high-molecular compound) | 100 parts by weight |
| Sodium thiocyanate (Water-soluble electrolyte) | 1.5 parts by weight |
| Polyethylene glycol (Water-soluble high-molecular compound) | 2 parts by weight |

The above materials were compounded without adding any other additives, kneaded by a pressure kneader and dispersed uniformly. Subsequently, they were extruded in a five-strand form by a single screw extruder and air-cooled after hot cutting, thereby translucent pellets were obtained.

The surface resistance-relative humidity graph of the box-like translucent molded article which was injection-molded like Example I is shown in FIG. 1. Its surface resistance was $10^{10}\Omega$ at the relative humidity 50%.

Like Example I, when comparing the polyethylene pellets as the base high-molecular compound with the pellets obtained by Example II, very little was a difference therebetween.

| Example III | |
|---|---|
| Styrene-butadiene-styrene copolymer (Base high-molecular compound) | 100 parts by weight |
| Sodium thiocyanate (Water-soluble electrolyte) | 3 parts by weight |
| Polyvinyl alcohol (Water-soluble high-molecular compound) | 1 part by weight |
| Titanium oxide | 2 parts by weight |
| Phthalocyanic green | 0.05 parts by weight |

The above materials were kneaded uniformly by a roller machine heated at a temperature of 90° C., and the thus obtained elastic material was divided in a sheet form. Subsequently, light green color pellets were obtained by way of a pelletizer (make by Horai Works, Ltd.). The surface resistance-relative humidity of the sheet-like molded article having the thickness 2 mm which was injection-molded by using those pellets is shown in FIG. 1.

Its surface resistance was $10^9\Omega$ in the atmosphere of the relative humidity 50%. When comparing the pellets made of only the base high-molecular compound with the pellets obtained by Example III, there was no difference between the former and the latter in view of physical properties.

| Example IV | |
|---|---|
| Ethylene propylene rubber (Base high-molecular compound) | 100 parts by weight |
| Potassium chloride (Water-soluble electrolyte) | 6 parts by weight |
| Polyvinyl alcohol (Water-soluble high-molecular compound) | 6 parts by weight |
| Clay | 100 parts by weight |
| Process oil | 20 parts by weight |
| Zinc white | 5 parts by weight |
| Dicumyl peroxide | 7 parts by weight |

The above materials were kneaded at a temperature of 70° C. by a roller and dispersed uniformly. After they were divided in a sheet form, they were filled in a roller-like mold of 30 mm$\phi$, heated and cured for 30 minutes at 160° C. by a press machine. The surface resistance-relative humidity graph of the article molded thus is shown in FIG. 1. Its surface resistance was $10^{10}\Omega$ at the relative humidity 50%.

When having compared the rubber composition according to this invention with the rubber composition which was formed by removing the water-soluble potassium and the polyvinyl alcohol, very little was a difference therebetween in view of the physical properties.

The following was the test result based on JIS.

| | Test piece molded by ethylene propylene rubber as base high-molecular compound | Molded article based on Example III |
|---|---|---|
| Tensile stress 200% | 22 kgf/cm² | 20 kgf/cm² |
| Tensile strength | 66 kgf/cm² | 65 kgf/cm² |
| Elongation | 550% | 530% |
| Hardness (JIS - A) | 66 | 64 |
| Tear strength | 29 kg/cm | 26 kg/cm |

The aforesaid test result based on JIS was obtained under the following conditions.

| | Size of test piece | Test conditions |
|---|---|---|
| Tensile stress 200% | 2 mm at thickness | Obtained by tensile speed 500 mm/min. |
| Tensile strength | 2 mm at thickness | Obtained by tensile speed 500 mm/min. |
| Elongation | 2 mm at thickness | Obtained by tensile speed 500 mm/min. |
| Hardness | 12 mm at thickness | Obtained by a Spring-type A tester |
| Tear strength | 2 mm at thickness | Obtained by tensile speed 500 mm/min. |

In Examples I and II the thermoplastic resin was used as the base high-molecular compound and in Example III the thermoplastic rubber was used as the base high-molecular compound. And, the above two materials were injection-molded. The compounding amount of the water-soluble electrolyte and the water-soluble high-molecular compound respectively is most preferably from 1 to 5 weight parts.

Figure 2:
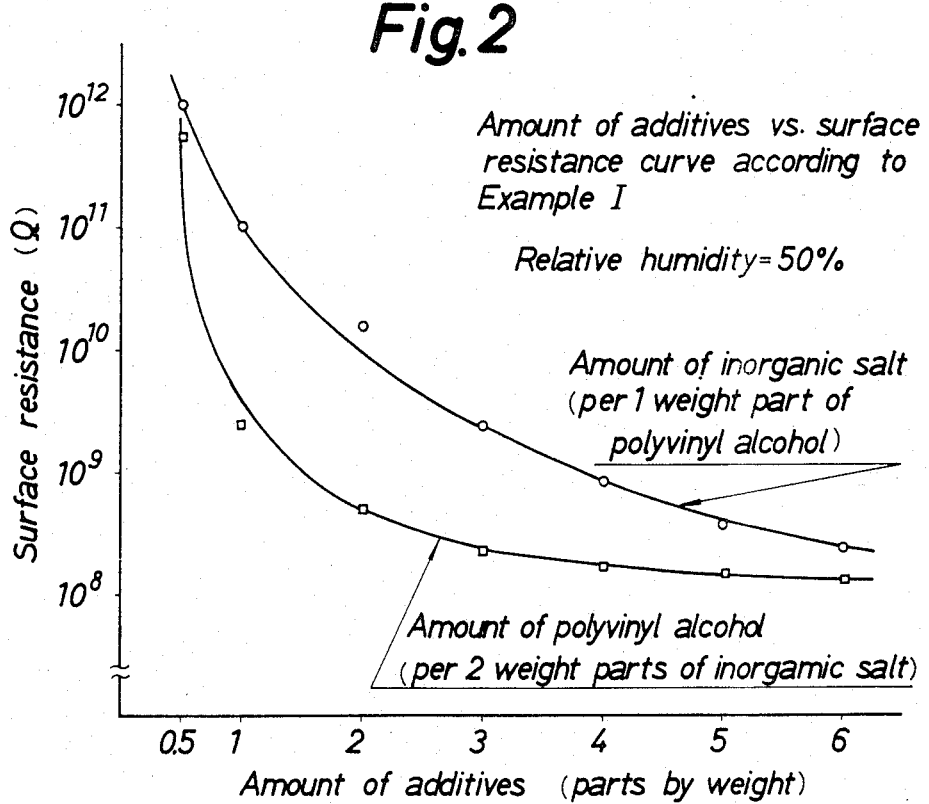
FIG. 2 is a graph showing a relationship of the amount of additives with the surface resistance according to Examples I, in which the amount of an inorganic salt (magnesium chloride) and a polyvinyl alcohol respectively is different.

FIG. 2 shows a relative humidity-surface resistance curve, in which the compounding amount of the water-soluble electrolyte and the water-soluble high-molecular compound respectively is varied in the scope of from 0.5 to 6 weight parts. When the above compounding amount becomes less than 1 weight part, the surface resistance becomes higher, thereby the composition thus obtained is not available for practical use. When the above compounding amount is over 5 weight parts, the surface resistance becomes lower, but both the inorganic salt and the water-soluble high-molecular absorb a water content in the atmosphere, thereby the surface of the composition thus formed becomes whitely turbid. Accordingly, its plastic deformation occurs and the quality as well as the outer appearance is deteriorated.

The same kind of test for the other examples was carried out and the nearly similar results were obtained.

In Example IV the so-called rubber was used as the base high-molecular compound and molded by the compression molding. FIG. 3 shows a graph showing a relationship of the amount of additives with the surface resistance according to Example IV, in which the compounding amount of the water-soluble electrolyte and the water-soluble high-molecular compound respectively is varied.

According to this example, when the above compounding amount is less than 5 weight parts, the surface resistance becomes higher and the composition thus formed was not available for practical use. When it is over 10 weight parts, the surface resistance becomes lower, but both the inorganic salt and the water-soluble high-molecular compound absorb a water content in the atmosphere, thereby the surface of the article molded thus becomes whitely turbid. Accordingly, the quality and outer appearance are deteriorated.

As a conclusion, when the thermoplastic resin and the rubber are used, the compounding amount of the water-soluble electrolyte and the water-soluble high-molecular compound respectively is preferably from 1 to 10 weight parts per 100 weight parts of the base high-molecular compound.

According to this invention, it is not necessary to add carbon black or brown colorant. By making use of a natural color of the base high-molecular compound itself, a light color molded article can be obtained. Further, it can be transparent and a beautiful outer appearance is obtained.

What is claimed is:

1. An electrically conductive polymeric composition comprised of 100 parts by weight of a polymer with (a) from 1 to 10 parts by weight of a water-soluble electrolyte and (b) from 1 to 10 parts by weight of a water-soluble organic compound selected from the group consisting of polyethylene glycol, polyvinyl alcohol and a partially saponified polymethacrylate, said electrically conductive polymeric composition being colored into and desired color.

2. The electrically conductive polymeric composition as claimed in claim 1 wherein the polymer is a thermoplastic resin.

3. The electrically conductive polymeric composition as claimed in claim 2 wherein said thermoplastic resin is acrylonitrile-butadiene-styrene resin.

4. The electrically conductive polymeric composition as claimed in claim 2 wherein said thermoplastic resin is polystyrene.

5. The electrically conductive polymeric composition as claimed in claim 2 wherein said thermoplastic resin is polyethylene.

6. The electrically conductive polymeric composition as claimed in claim 1 wherein said polymer is rubber.

7. The electrically conductive polymeric composition as claimed in claim 1 wherein said polymer is a thermoplastic rubber.

8. The electrically conductive polymeric composition as claimed in claim 1 wherein said water-soluble electrolyte is a water-soluble, hygroscopic inorganic salt.

9. The electrically conductive polymeric composition as claimed in claim 8 wherein said water-soluble, hygroscopic inorganic salt is a metallic halide.

10. The electrically conductive polymeric composition as claimed in claim 8 wherein said water-soluble, hygroscopic inorganic salt is a metallic salt of thiocyanic acid.

* * * * *